March 19, 1963  E. G. SUNDBERG ETAL  3,082,280
LEAD ACCUMULATOR ELECTRODE CONSTRUCTION
Filed June 26, 1961

INVENTORS
Erik G. Sundberg
Bror G. Ousböck

BY
ATTORNEYS

United States Patent Office 3,082,280
Patented Mar. 19, 1963

3,082,280
LEAD ACCUMULATOR ELECTRODE
CONSTRUCTION
Erik G. Sundberg, Nol, and Bror Gunnar Ousback, Goteborg, Sweden, assignors to Aktiebolaget Tudor, Stockholm, Sweden, a corporation of Sweden
Filed June 26, 1961, Ser. No. 119,354
Claims priority, application Sweden July 7, 1960
9 Claims. (Cl. 136—43)

The present invention relates to lead accumulator electrodes of the type known in the art as "iron clad" and of which each consists of a number of electrode elements arranged side by side in spaced relationship united by top and bottom traverse bars, and more specifically to novel construction for the electrode element per se.

Each electrode element conventionally consists of an electrically conductive metal core usually of lead or a lead alloy, which is surrounded by electro-chemically active material, usually lead or lead oxides in powder form with such additions as may be desired to give the finished electrodes desired qualities as respects porosity and resistance to sulfonation. The active material surrounding the lead core enclosed therein is in turn enclosed by a tubular envelope of electrolyte resistant, electrolyte permeable and preferably electrically non-conductive material. To provide the desired operating characteristics, the tubular envelope is carefully made to be concentric about the axis of the core, and the space between the envelope and the conductive core is filled with the active material.

The procedure of manufacturing tubular plate electrodes is usually performed in the way that an electrode skeleton consisting of an number of electrode conductive cores arranged in spaced side by side relationship are formed integrally with the top traverse bar as by casting or stamping. The tubular envelope is then placed over the core and made to have a length substantially equal to the length of the core. The space between the cores and the envelopes is thereafter filled with active material, or more precisely the material to be active after electroforming the finished electrode, in a known manner.

To position the tubular envelopes concentrically about the axis of the conductive cores, the cores are initially formed with centering arrangements which are commonly referred to as centering fins. These fins may be relatively thin walled and extend radially from each core to touch the inside of the tubular envelope. The fins are arranged on each core usually in pairs opposite to each other, and with one pair at an angle of 90° to the other at the same longitudinal position on the core. Similar centering fin groups are arranged in the same way at spaced positions along the axis or length of the core. The casting dies are made in such way that the centering fins are produced simultaneously together with the cores during casting. When tubular envelopes are placed onto the cores, the inner wall of each envelope thus presses against the external edges of the centering fin.

The foregoing arrangement regarding centering fins has various disadvantages which have not hitherto been overcome. With regard to serviceable life, a serious disadvantage results from the fact that during operation of the accumulator cell, metallic deposits build up on the external edges of the fins by an electrolytic process and cause the fins to grow radially. After a time the fins penetrate the tubular envelopes which in turn burst and thus release the active material to destroy operation of the battery. Additionally, the centering fins cause an undesirable increase in weight of the electrodes and of the battery.

A major object of the present invention, therefore, is to provide novel spacer members which may be manufactured separately from the core of the tubular electrode and thus be of a light weight, non-conductive material which is resistant to the building up of metallic deposits. These spacer elements are placed on the core to serve as means for assuring that the tubular envelope holding the active material in place is concentric with the axis of the core, and thus enable the cores of each electrode to be formed, more or less as a pin and without the centering pins previously in common use.

Another major object of the present invention is to provide novel spacer members around or through which the active material may pass so that the space between the core and the envelope may be filled with active material by inserting it through the end of the envelope which may thereafter be closed by a suitable plug.

A further object of this invention is to provide a novel electrode construction utilizing open ring spacer members to reduce corroding which are placed on the core during assembly of the electrodes, the several spacer members being spaced along the core and oriented differently to hold the envelope in a position coaxially about the core.

Another object is to provide means on the core to prevent the novel spacer members from inadvertently moving axially along the core after the spacer members are placed thereon.

These and other objects of the invention will become more fully apparent from the claims and from the description as it proceeds in connection with the appended drawings, wherein:

Figure 1:
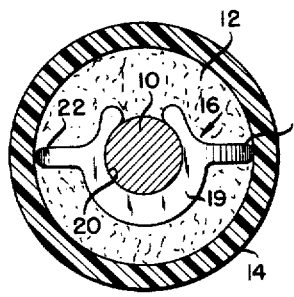
FIGURE 1 is a top plan view in section of an electrode in section showing one form of a spacer member in accordance with the present invention in position between the tubular envelope and the core.

The electrode plate comprises a number of rods or cores 10 which are inter-connected at their upper and lower ends by traverse bars which are not illustrated in the drawings, but which may be similar to the construction shown in FIGURE 1 of the U.S. application of Erik G. Sundberg, Serial No. 601,394 filed August 1, 1956. Core 10 serves as the support for the pencil of active material 12. Each of the pencils 12 of active material is enclosed in a tubular cover 14 which is permeable to the electrolyte of the accumulator cell and is made of an electrolyte resistant insulating material. Such materials may conventionally consist of thin-walled perforated tubes of a synthetic resin material such as vinyl polymer, polystyrene for example, which may have an inner coating of a porous fabric, of for example glass fibers. A tubular envelope of this kind is disclosed in U.S. Patent No. 2,747,007.

Tubular envelope 14 is held in a position coaxial with respect to the axis of core 10 by a plurality of spacer members 16 and 18, the details of which will be described below. Spacer members 16 and 18 are located at spaced positions along core 10 and are sufficiently close together to assure tubular envelope 14 is properly aligned with respect to the axis of core 10. Core 10 therefore may be a smooth pin and is not initially formed with a centering arrangement.

Figure 3:
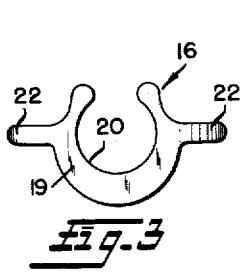
FIGURES 3, 4 and 5 are a top plan, and front and side elevation views respectively of a novel spacer member in accordance with the present invention.
Figure 4:
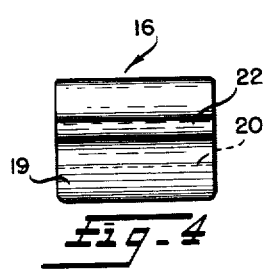
Figure 2:
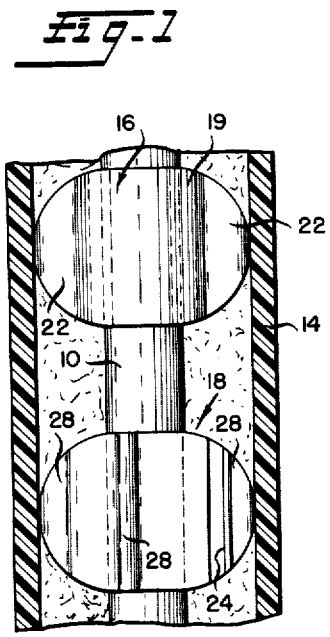
FIGURE 2 is an elevational view in section showing a portion of the length of the electrode with two different spacer members in accordance with the present invention separated longitudinally along the axis of the core.
Figure 5:
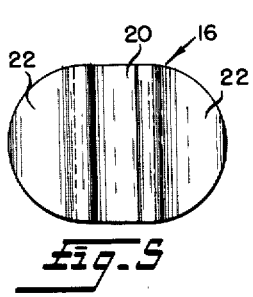

Spacer member 16 is shown in detail in FIGURES 3, 4 and 5. In this embodiment of the centering arrangement, spacer member 16 has a U-shaped portion 19 with a central aperture defined by walls 20. Body portion 19 has a slot on one side which enables the spacer member to be placed on core 10. Flanges 22 are provided on opposite sides with the peripheral edges thereof contacting the inside walls of tubular envelope 14 as illustrated in FIGURE 2 to serve as the centering means.

Spacer member 18 is preferably made of a non-conductive material which is resistant to the electrolyte and may be made of the same material of which tubular member 14 is made. It is also in some instances desirable to make spacer member 16 of a resilient electrically conductive material which is coated with a non-conductive material.

Figure 6:
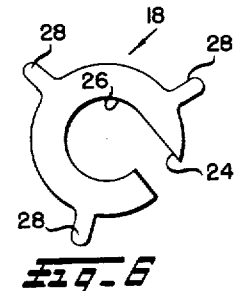
FIGURE 6 is a top plan view of a further form of spacer member in accordance with the present invention.

As corrosion or metallic deposits form on any exposed portion of core 10, it is advantageous to provide a slot in the body portion of the spacer member which is oriented as shown in FIGURE 6 to have one side wall 24 tangent to the walls of the central opening 26. By such arrangement of the slot, corroding attacks on the core are precluded which otherwise occur at the location where the slotted opening is provided in the body of the spacer member. In the embodiment shown in FIGURE 6 three flanges 28 are provided to serve the centering means for tubular envelope 14.

Figure 8:
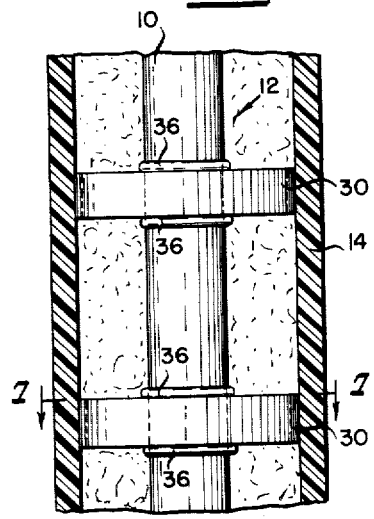
FIGURE 8 is an elevation view in section of the electrode construction of FIGURE 7 showing the core member provided with closed rings which prevent the novel spacer elements of the present invention from inadvertently sliding axially along the length of the core.
Figure 7:
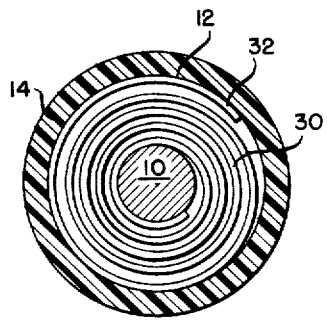
FIGURE 7 is a top plan view in section of a closed ring type spacer member on an electrode.

As another means of avoiding the corroding attacks on conductive cores 10, it is convenient to make the spacer element of an entirely closed ring which is radially elastic. In order to have the ring diameter widen or expand when securing the spacer member onto core 10, such member may be in the shape of a spiral. In the embodiment shown in FIGURES 7 and 8 the spacer member 30 is illustrated in the form of a spiral having an inner portion which substantially surrounds core 10 and an outer portion 32 which extends around a large portion of the inside surface of tubular envelope 14 to thereby properly space tubular member 14 about core 10. In such embodiment it is desirable to have the inside diameter of spacer member 30 slightly smaller than the diameter of core 10 on which it is to be placed in order that it will be held securely in position.

To further reduce the likelihood of inadvertent sliding of spacer member 30 along the axis of core 10, closed rings 36 (see FIGURE 8) may be added to core 10 to be on opposite sides or at least on the lower side of each spacer member 30. The closed rings may be heated to expand and thus fit on core 10 after which they shrink to be secure at the desired position upon cooling. Rings 36 may be also applied by means of a suitable adhesive which is electrolyte resistant if desired.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an electrode assembly for a lead storage battery having a plurality of cores of conductive material mounted in a side by side relation each surrounded with active material and an open-ended outer tubular envelope resistant to and permeable by the electrolyte surrounding and confining said active material together with means plugging said envelope open end: means for mounting said envelope in a position concentric about the axis of its respective core of conductive material comprising a ring shaped spacer member having an outer surface of electrolyte resistant non-conductive material and an inner surface contacting said core, said spacer member having an open path from its outer surface to its inner surface and being expandable to permit insertion of said spacer on said core at a position intermediate the ends of the core, and means providing a path from one side of said spacer to the other to allow the assembly of said envelope on said core and the subsequent filling of said envelope with the active material through said open end.

2. In an electrode assembly for a lead storage battery having a plurality of cores of conductive material mounted in a side by side relation each surrounded with active material and an open-ended outer tubular envelope resistant to and permeable by the electrolyte surrounding and confining said active material together with means plugging said envelope open end: means for mounting said envelope in a position concentric about the axis of its respective core of conductive material comprising a spacer member formed separately from the core and having an outer surface of electrolyte resistant non-conductive material, said spacer member having an open path from its outer surface to its inner surface and being expandable to be inserted on said core at a position intermediate the ends of the core, said spacer having means providing a path from one side of said spacer to the other to allow the assembly of said envelope on said core and the subsequent filling of said envelope with the active material through said open end.

3. The electrode assembly as defined in claim 2 wherein the core is provided with means to prevent axial movement of the spacer member axially along the core.

4. In an electrode assembly for a lead storage battery having a plurality of cores of conductive material mounted in a side by side relation each surrounded with active material and an open-ended outer tubular envelope resistant to and permeable by the electrolyte surrounding and confining said active material together with means plugging said envelope open end: means for mounting said envelope in a position concentric about the axis of its respective core of conductive material comprising a pair of spacer members positioned intermediate the ends of the core and formed separately from said core, said members each having an outer surface of electrolyte resistant non-conductive material and being formed to frictionally engage the core to remain in the position on the core at which each is placed, said spacer having means providing a path from one side of said spacer to the other to allow the assembly of said envelope on said core and the subsequent filling of said envelope with the active material through said open end.

5. The electrode assembly as defined in claim 4 wherein the spacer member is formed of a resilient material and has a central aperture with a slot through one side wall, the width of the slot being slightly smaller than the size of the core cross-section to permit the spacer member to be inserted on the core, and one of said slot walls being tangent to a wall of said central aperture.

6. The electrode assembly as defined in claim 4 wherein the spacer member is spiral shaped.

7. The electrode assembly as defined in claim 6 wherein the core is provided with means to prevent axial movement of the spiral shaped spacer member axially along the core.

8. In an electrode assembly for a lead storage battery having a plurality of cores of conductive material mounted in a side by side relation each surrounded with active material and an open-ended outer tubular envelope resistant to and permeable by the electrolyte surrounding and confining said active material together with means plugging said envelope open end: means for mounting said envelope in a position concentric about the axis of its respective core of conductive material comprising a spacer member having an outer surface of electrolyte resistant non-conductive material, said spacer member having a central aperture and a side having a slot adapting the spacer member to be placed on the core and a plurality of outwardly directed, integral flanges all equi-distant from the axis of said aperture, said integral flanges providing a path from one side of said spacer to the other to allow the assembly of said envelope on said core and the subsequent filling of said envelope with the active material through said open end.

9. In an electrode assembly for a lead storage battery having a plurality of cores of conductive material mounted in a side by side relation each surrounded with active material confined in a tubular shape by an open-ended outer tubular envelope of material both resistant to and permeable by the electrolyte together with means plugging said envelope open end, means for mounting said envelope in a position concentric about the axis of its respective core of conductive material comprising a plurality of spacer members spaced along the core, each of said members having an outer surface of electrolyte resistant non-conductive material and formed with a central aperture and slot in one edge to be inserted around said core, each member further having edge surface portions remote from the axis of the central aperture to contact said tubular envelope and means providing a path from one side of said member to the other to allow the assembly of said envelope on said core and the subsequent filling of said envelope with the active material through said open end, and the several members being oriented to contact the tubular envelope at different radial positions.

References Cited in the file of this patent

FOREIGN PATENTS 291,138     Great Britain _____ May 22, 1928

UNITED STATES PATENT OFFICE
CERTIFICATE OF CORRECTION

Patent No. 3,082,280            March 19, 1963

Erik G. Sundberg et al.

It is hereby certified that error appears in the above numbered patent requiring correction and that the said Letters Patent should read as corrected below.

Column 1, line 12, for "known in the art as "iron clad" and" read -- sold under the trademark "Ironclad" and --.

Signed and sealed this 14th day of April 1964.

(SEAL)
Attest:

ERNEST W. SWIDER
Attesting Officer

EDWARD J. BRENNER

Commissioner of Patents